(12) United States Patent
Suzuki et al.

(10) Patent No.: US 6,454,423 B1
(45) Date of Patent: Sep. 24, 2002

(54) SPREAD ILLUMINATING APPARATUS WITH MEANS FOR POSITIONING TRANSPARENT SUBSTRATE

(75) Inventors: Shingo Suzuki; Koichi Toyoda, both of Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 09/714,482

(22) Filed: Nov. 17, 2000

(30) Foreign Application Priority Data

Dec. 28, 1999 (JP) ............................................ 11-374097

(51) Int. Cl.⁷ ................................................ F21V 7/04
(52) U.S. Cl. ........................ 362/31; 362/551; 362/223
(58) Field of Search ......................... 362/31, 551, 223, 362/561

(56) References Cited

U.S. PATENT DOCUMENTS 6,286,970 B1 * 9/2001 Egawa et al. ................. 362/31

FOREIGN PATENT DOCUMENTS

| JP | A 1-182076 | 7/1989 |
|---|---|---|
| JP | A 11-210559 | 8/1999 |

\* cited by examiner

Primary Examiner—Sandra O'Shea
Assistant Examiner—Ronald E. DelGizzi
(74) Attorney, Agent, or Firm—Oliff & Berridge, PLC

(57) ABSTRACT

A light reflection member 16 for covering a light conductive member 13 is provided with a claw 16a. The claw 16a is a positioning means for setting the light conductive member 13 to a transparent substrate 2. The positional relation between the transparent substrate 2 and the light conductive member 13 is ensured by this claw 16a, whereby the assembling of a spread illuminating apparatus 1 is made easier, the positional shifting between the members due to aging is prevented and a desired brightness of the spread illuminating apparatus 1 is secured.

5 Claims, 5 Drawing Sheets

SPREAD ILLUMINATING APPARATUS WITH MEANS FOR POSITIONING TRANSPARENT SUBSTRATE

BACKGROUND OF THE INVENTION

1. Field of the invention

This invention relates to a spread illuminating apparatus for signboards or various kinds of reflection type display apparatus.

2. Description of the Related Art

Nowadays, a function to display various information is added to electronic products, and it has become indispensable to install a display portion to display those information. Further, in a portable electronic product such as a portable telephone and a notebook personal computer, in which all components are expected to be miniaturized and light weighted, a liquid crystal display device which occupies a small area in the product and is light weighted has been widely used for the display portion (the ratio of thickness to the display area is quite small). However, since the liquid crystal display device itself does not emit light, in consideration of usage in a dark place or at night, a separate illuminating apparatus needs to be provided besides the liquid crystal display apparatus. In order to answer that demand, an illuminating apparatus as explained below has been invented.

In a spread illuminating apparatus, a transparent substrate made of a transparent material is disposed on a front surface or a back surface of a liquid crystal display device, a side surface of the transparent substrate is illuminated to introduce light into the transparent substrate, and the introduced light is supplied uniformly to the display portion of the liquid crystal device from the surface of the transparent substrate, thereby illuminating the entire liquid crystal display device.

As a light source to illuminate the side surface of the transparent substrate, a fluorescent tube (cold cathode ray fluorescent tube or hot cathode ray fluorescent tube) has been used conventionally. However, the fluorescent tube uses a high voltage to emit light requiring a means for supplying a high voltage, which is contrary to the desire that components of a portable product be miniaturized and light weighted. In order to solve such a problem, the present inventors have developed a spread illuminating apparatus using a light emitting diode, etc. as a spot-like light source, and the present applicant has disclosed a detail thereof in the Japanese patent application No. Hei 1-182076. A spread illuminating apparatus 1 having a light source which uses a light emitting diode comprises, as shown in FIGS. 7 and 8, a transparent substrate 2 and a light source 11 as main components, where a lower surface 5 of the transparent substrate 2 is disposed opposing an observing surface of a reflection type liquid crystal element. A difference from the conventional spread illuminating apparatus resides in that, instead of using a fluorescent tube as a bar-like light source, a spot-like light source 12 and a bar-like light conductive member 13 (in FIG. 8, it is indicated in black so that it can be easily distinguished) are provided as the light source 11.

In the example shown in the figure, a light emitting diode is used as a spot-like light source 12, and further, the light conductive member 13 made of a transparent material is disposed at a given spacing along one side surface 3 of the transparent substrate 2, and the spot-like light source 12 is disposed close to one end 14 of the light conductive member 13. Further, the light conductive member 13 is provided with an optical path conversion means 15. The optical path conversion means 15 is provided with, for instance, a triangular groove on a surface 19 opposite to a surface 18 opposing the one side surface 3 of the transparent substrate 2, thereby introducing the light entering the light conductive member 13 into the transparent substrate 2.

In order to introduce the light highly efficiently into the transparent substrate 2, longitudinal surfaces of the light conductive member 13 except the surface opposing the transparent substrate 2 are covered with a light reflection member 16 (cover). Further, the efficiency can be greatly improved by covering at least a part where the optical path conversion means 15 is formed even when the light reflection member 16 can not cover the surrounding surfaces of the light conductive member 13 on account of a designing restriction such as avoiding an interference with other components. For reference, the light reflection member 16 is formed of a hard resin molding surfaced with a film vapored with a metal such as silver, a white film or a film coated with white paint, or an aluminum plate or a stainless steel plate provided with a mirror finished surface and worked by bending.

As mentioned above, the spread illuminating apparatus 1 is constituted by a combination of the transparent substrate 2, the spot-like light source 12, the light conductive member 13 and the optical path conversion means 16. In order for the spread illuminating apparatus 1 to give off a desired brightness, the above constituent parts needs to be mutually positioned as precisely as possible. Further, since the spread illuminating apparatus 1 is often used in portable type electronic products, if no countermeasures are taken, in particular, against changes in the positional relation of the constituent parts due to aging, it may suffer a deterioration in brightness. Also, it is indispensable that the above constituent parts can be positioned easily when they put together for assembling the spread illuminating apparatus.

SUMMARY OF THE INVENTION

The present invention has been made in light of the above problem, and the purpose thereof is to realize a secure positioning of the bar-like light source to the transparent substrate to carry out easy assembling of the spread illuminating apparatus and to secure a desired brightness of the spread illuminating apparatus without an influence from aging.

According to a first aspect of the present invention, in a side light type spread illuminating apparatus, in which a bar-like light source is disposed close to a side surface of a transparent substrate made of a transparent material, a positioning means for setting the bar-like light source to the transparent substrate is provided. According to the present invention, the positional relation between the transparent substrate and the bar-like light source is ensured by the above positioning means, to thereby secure a desired brightness of the spread illuminating apparatus.

According to a second aspect of the present invention, the positioning means is provided on a cover which covers the bar-like light source, whereby the cover and the positioning means are integrally formed at a time. Further, the positional relation between the transparent substrate, the bar-like light source and the cover is ensured, to thereby secure a desired brightness of the spread illuminating apparatus.

According to a third aspect of the present invention, the positioning means is provided on at least one longitudinal end of the cover. In the case where the positioning means is provided merely on one end of the cover, one end of the transparent substrate and one end of the bar-like light source are set to coincide with the one end of the cover based on the positioning means. In the case of providing the positioning means on both ends of the cover, the positions of the end of the transparent substrate and the end of the bar-like light source are determined by those two positioning means.

According to a fourth aspect of the present invention, the positioning means is provided at a position of the cover, which is lapped over the transparent substrate. Accordingly, the positioning between the cover and the transparent substrate is secured.

According to a fifth aspect of the present invention, the positioning means is formed with a claw raised from the end of the cover. Thus, the positional relation between the transparent substrate, the bar-like light source and the cover is guaranteed by this claw.

According to a sixth aspect of the present invention, the bar-like light source comprises a bar-like light conductive member and a spot-like light source disposed on at least one end of the light conductive member. According to this constitution, in the side light type spread illuminating apparatus formed with the bar-like light conductive member and the spot-like light source, the positional relation between the light source and the transparent substrate is guaranteed, thereby securing a desired brightness for the spread illuminating apparatus.

According to a seventh aspect of the present invention, the positioning means is provided at a position clear of an end of the light conductive member in order to prevent the positioning means from blocking light entering the bar-like light conductive member from the spot-like light source.

DETAILED DESCRIPTION OF THE PREFERRED EMBODIMENTS

Hereinafter, an embodiment of the present invention is explained with reference to the drawings attached. For reference, portions identical or similar to the conventional art are indicated under the same signs and detailed explanations thereof are omitted.

Figure 1:
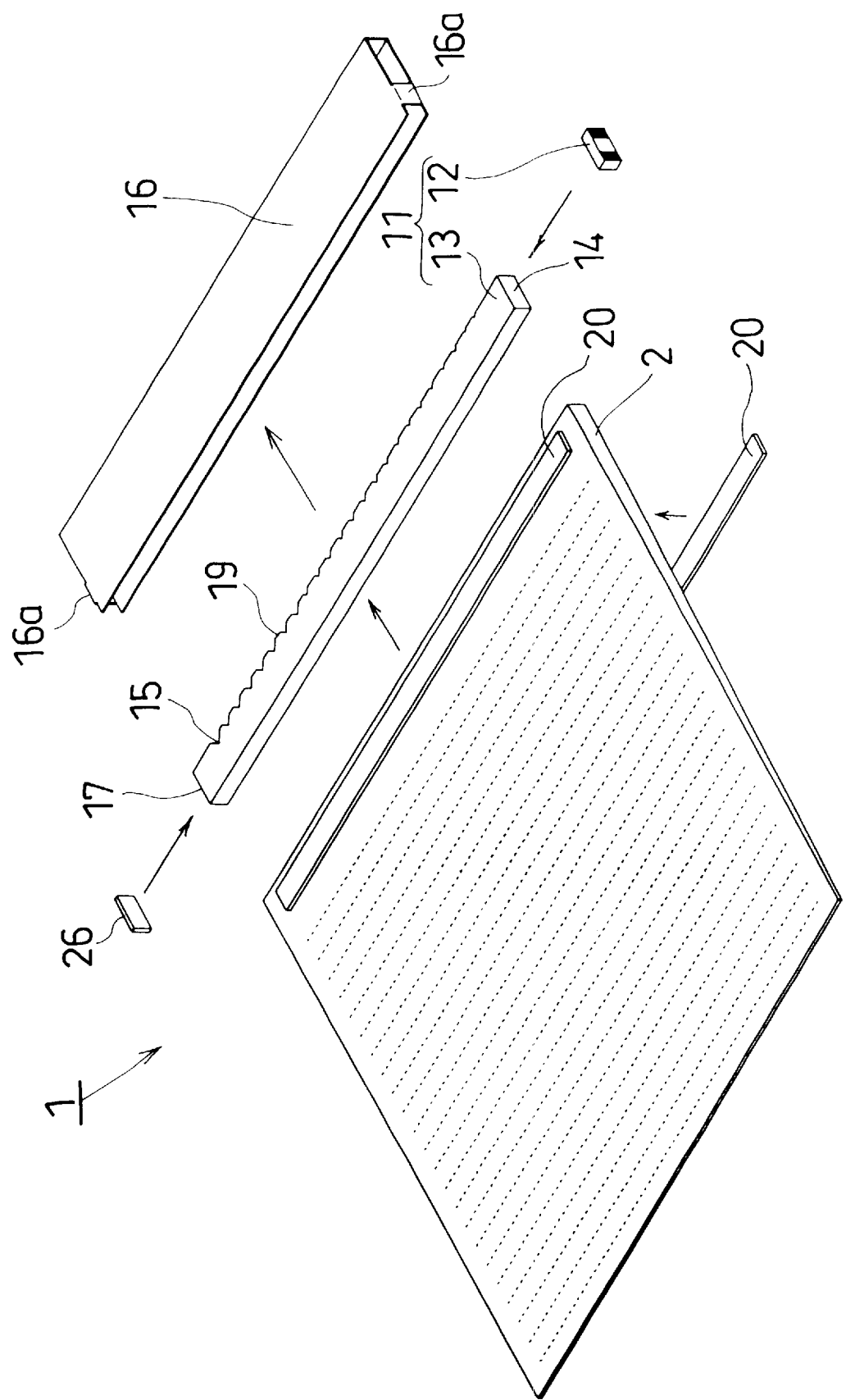
FIG. 1 is an exploded perspective view showing the embodiment of a spread illuminating apparatus of the present invention.
Figure 2:
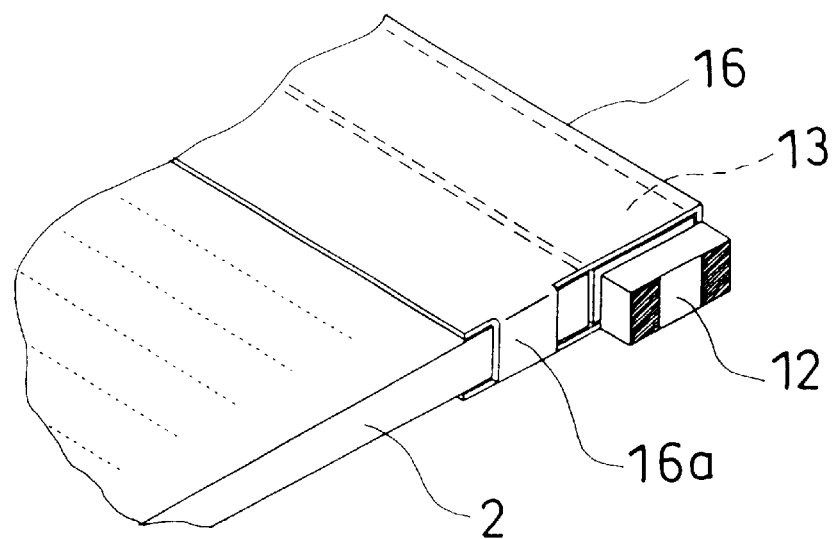
FIG. 2 is an enlarged view showing the main part of the spread illuminating apparatus of FIG. 1 when assembled.

As shown in FIG. 1, a spread illuminating apparatus 1 according to an embodiment of the present invention is formed by a combination of a transparent substrate 2, a light source 11 consisting of a spot-like light source 12 (light emitting diode) and a light conductive member 13, and a light reflection member 16 as a cover for the light conductive member 13. Claws 16a which function as a positioning means for setting the light conductive member 13 to the transparent substrate 2 are provided on both longitudinal ends of the light reflection member 16. In the example shown in the figure, the light reflection member 16 is formed of a bent metal plate, and the claw 16a is punched out integrally with the light reflection member 16 from a metal sheet and then raised. Further, the depth of the light reflection member 16 is larger than the width of the light conductive member 13 so that when all components are assembled, the light reflection member 16 overhangs to cover a given area of the transparent substrate 2 from the end thereof as shown in FIG. 2, wherein the claws 16a are positioned so as to overlap the transparent substrate 2.

In the example of FIG. 1, the spot-like light source 12 is provided on one end 14 of the light conductive member 13 and a light reflection means 26 is provided on the other end 17. The light reflection means 26 is constituted by providing a white (a white dispersive foamed type) reflection plate or a reflection plate comprising a metal vapoured film, or by forming a metal layer or a coating layer directly on the surface of the other end 17 of the light conductive member 13 by vaporing metal (silver, aluminum, etc.) or by applying a white paint, respectively. For reference, as to an explanation regarding the light reflection means 26, Japanese patent application No. Hei 11-210559 by the present inventors discloses the details thereof. Note that a member indicated by the symbol 20 in FIG. 1 is a double-coated adhesive tape to fix the light reflection member 16 and the transparent substrate 2.

In this embodiment of the present invention, an optical path conversion means 15 of the light conductive member 13 is constituted by forming a triangular groove, but the optical path conversion means 15 can be constituted also by providing the surface of the light conductive member 13 with a light dispersion part which comprises minute ruggedness formed by partially applying a coarsening work such as sand blasting, or coating, in place of the minute ruggedness, formed by applying a white (or opaline) paint to the surface of the light conductive member 13. Further, the light reflection means 26 provided on the other end 17 of the light conductive member 13 may be replaced with another spot-like light sources 12 so that both ends of the light conductive member 13 are illuminated by each of the spot-like light sources 12. Still further, the light reflection member 16 may be formed of a hard resin molding surfaced with a film vapored with metal such as silver, a white film or a film painted white.

According to the embodiment thus constituted of the present invention, since the spread illuminating apparatus 1 is provided with the claws 16a as a positioning means for setting the light conductive member 13 to the transparent substrate, the positional relation between the transparent substrate 2 and the light conductive member 13 is ensured to make the assembling work easier and to prevent the assembly members from getting shifted due to aging, thereby making it possible to secure a desired brightness of the spread illuminating apparatus. Further, since the claws 16a are provided on both longitudinal ends of the light reflection member 16, it becomes possible to simultaneously form the positioning means together with the light reflection member 16 which has been conventionally used as a constituent component of the spread illuminating apparatus 1. Hence, there is no increase in the number of parts and working processes of the light reflection 16. In addition, since the claws 16a are positioned at a place overlapping the transparent substrate 2, the positioning between the light reflection member 16 and the transparent substrate 2 is secured.

In the example shown in FIG. 1, the positioning of the ends of the transparent substrate 2 and the light conductive member 13 is carried out by two claws 16a, but even if only one claw 16a is provided merely on one of the ends of the light reflection member 16, it is possible to securely determine the position of each member by setting the end of the transparent substrate 2 and the end of the light conductive member 13 to coincide with one end of the light reflection member 16 based on the one claw 16a.

Figure 3:
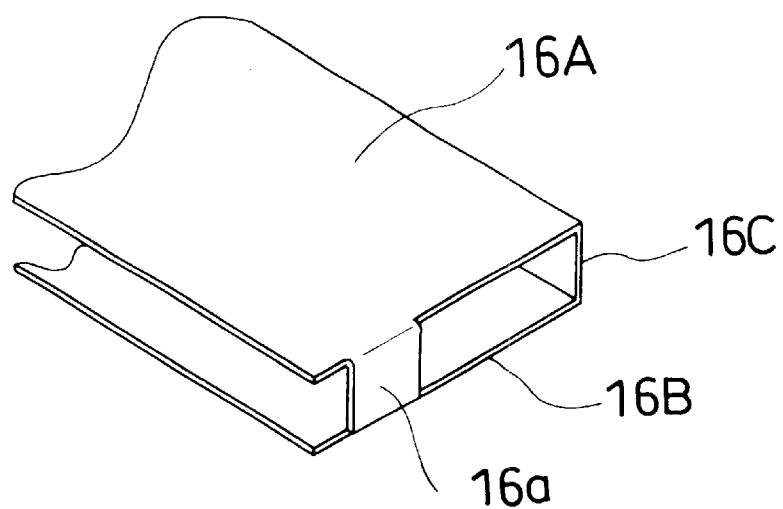
FIG. 3 is an enlarged partial view showing a claw structure of the light reflection member of the spread illuminating apparatus of FIG. 1.

Note that the claw 16a can be formed in various manners as described below. FIG. 3 shows a structure of the claw 16a of the light reflection member 16 shown in FIGS. 1 and 2. As shown in the figure, the light reflection member 16 comprises an upper surface 16A, a lower surface 16B and a side surface 16C which connects the former two surfaces. And, the claw 16a is formed by projecting a part of the upper surface 16A and then bending the projection toward the lower surface 16B. The tip end of the claw 16a is located near the lower surface 16B.

Figure 4:
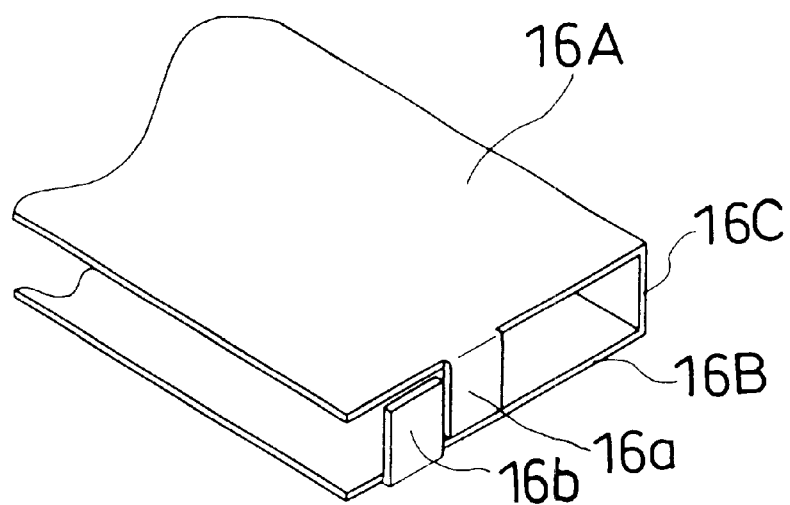
FIG. 4 is an enlarged partial view showing an applied example of the claw structure of the light reflection member of the spread illuminating apparatus of FIG. 1.

FIG. 4 shows another structure of the claw of the light reflection member 16. In this example, a part from each of the upper surface 16A and the lower surface 16B is projected, and the projection of the upper surface 16A is bent toward the lower surface 16B to form the claw 16a and the projection of the lower surface 16B is bent toward the upper surface 16A to form the claw 16b. The claws 16a and 16b are provided at a position where they do not overlap each other, and the tip end of the claw 16a is located near the lower surface 16B while the tip end of the claw 16b is located near the upper surface 16A.

Figure 5:
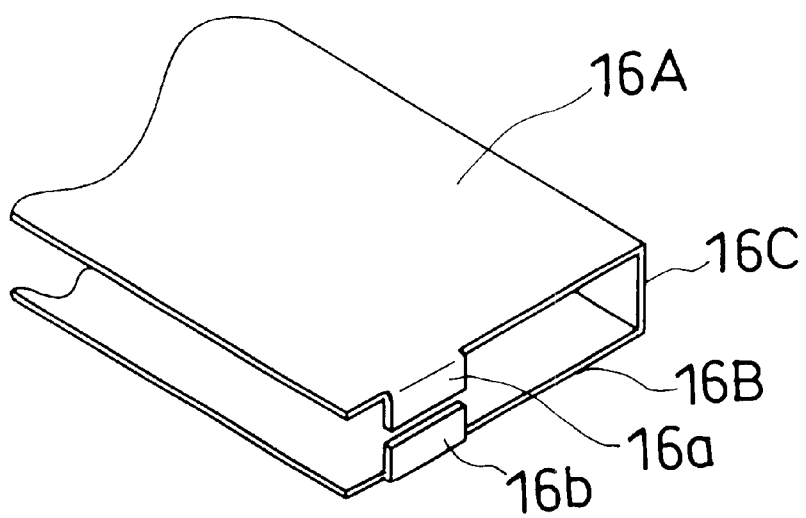
FIG. 5 is an enlarged partial view showing an applied example of the claw structure of the light reflection member of the spread illuminating apparatus of FIG. 1.

The example shown in FIG. 5 is identical with the example of FIG. 4 in providing the claws 16a and 16b on both of the surfaces 16A and 16B. However, the claws 16a and 16b are positioned facing each other, and hence their tip ends are opposing each other. The respective examples shown above in FIGS. 2 to 5 are appropriately selected in consideration of the conditions of the die for forming the light reflection member 16 and the plate-shaped materials.

Figure 6:
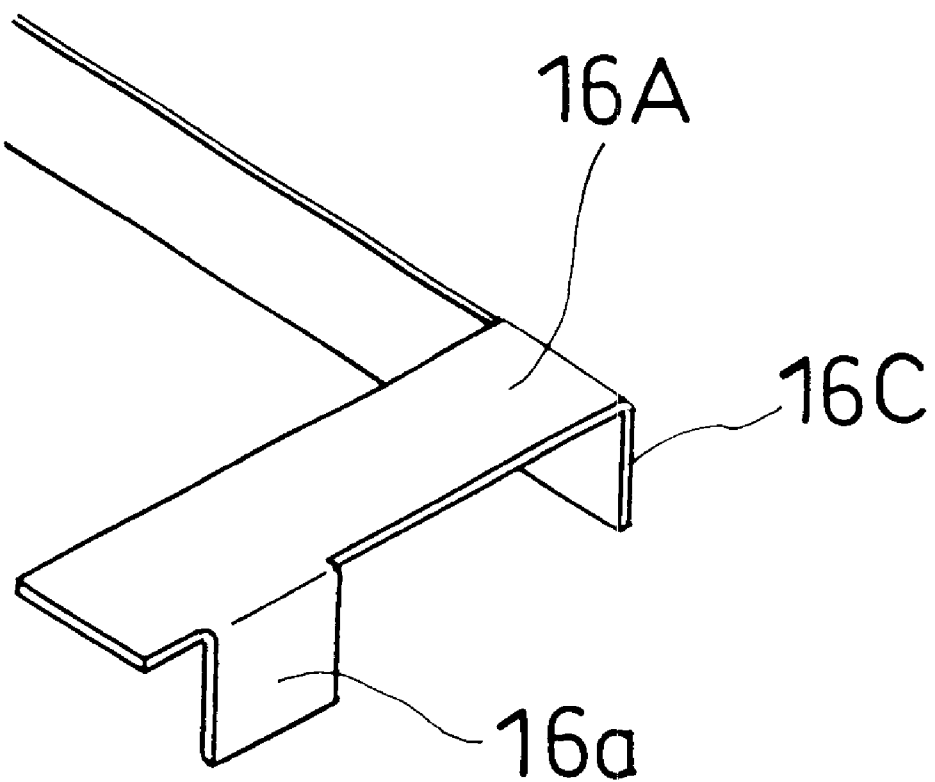
FIG. 6 is an enlarged partial view showing an applied example of the claw structure of the light reflection member of the spread illuminating apparatus of FIG. 1.
Figure 7:
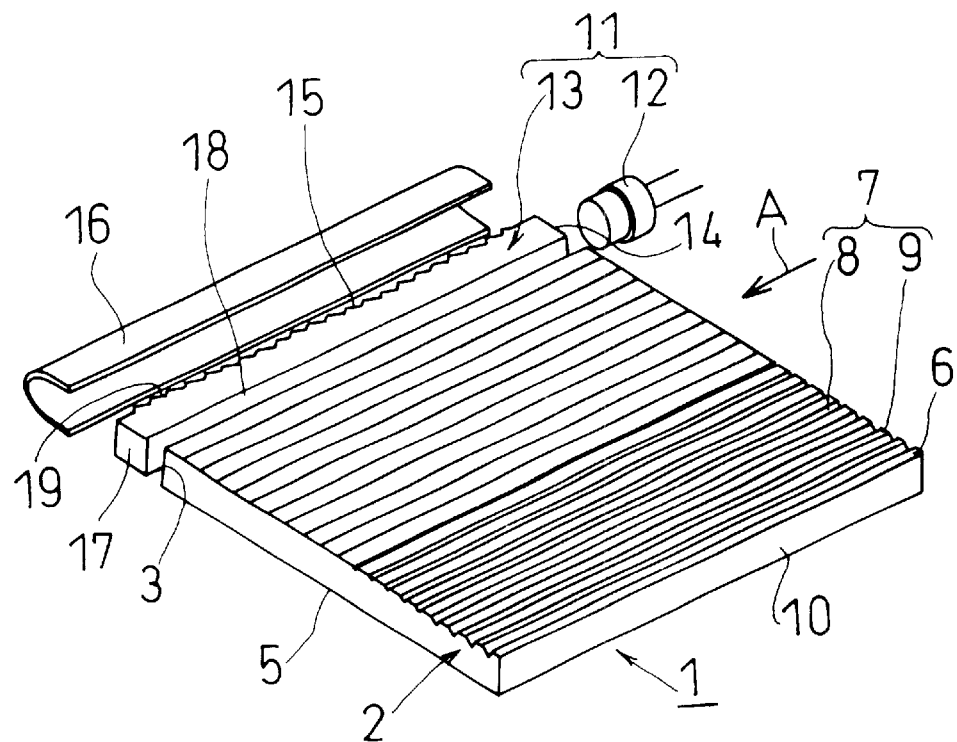
FIG. 7 is an exploded perspective view showing a construction of a conventional spread illuminating apparatus.
Figure 8:
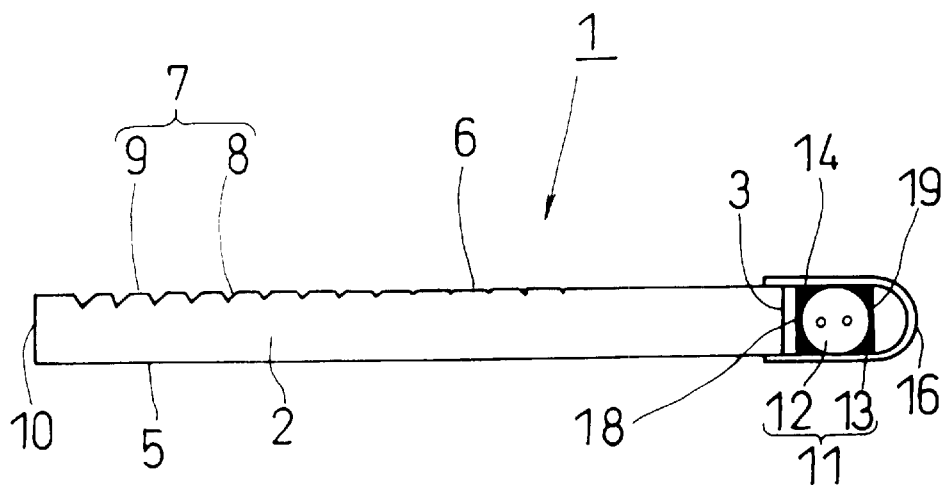
FIG. 8 shows a structure of the spread illuminating apparatus viewed from the direction indicated by the arrow A in FIG. 7.

Further, as shown in FIG. 6, even when a light reflection member 16 that consists merely of the side surface 16C is used from a designing point of view, the claw 16a can be provided by forming the upper surface 16A with a minimum area, thereby ensuring a secure positioning of each member in the same way as the light reflection members of the other examples.

For reference, in any of the light reflection member 16, the claw 16a (16b) is located at a position clear of the ends 14, 17 of the light conductive member 13, whereby the claw 16a (16b) never blocks light entering the light conductive member 13. Therefore, providing the claw 16a (16b) on the light reflection member 16 will not cause a deterioration in the brightness of the spread illuminating apparatus 1.

Since the present invention is structured as mentioned above, the following effects are expected.

According to the spread illuminating apparatus of the first aspect of the present invention, by securing the positioning of the bar-like light source to the transparent substrate, the spread illuminating apparatus can be assembled more easily, and it becomes possible to secure a desired brightness of the spread illuminating without incurring influence by aging.

Further, according to the spread illuminating apparatus of the second aspect of the present invention, the number of parts and working processes are prevented from increasing due to the provision of the positioning means.

Further, according to the spread illuminating apparatus of the third aspect of the present invention, by setting the end of the transparent substrate and the end of the bar-like light source to coincide with one end of the cover based on at least one positioning means, the positional relation between respective members is guaranteed and it becomes possible to secure a desired brightness of the spread illuminating apparatus.

Further, according to the spread illuminating apparatus of the fourth aspect of the present invention, it is possible to secure the positioning between the cover and the transparent substrate, thereby making the assembling of the spread illuminating apparatus easier and securing a desired brightness of the spread illuminating apparatus.

Further, according to the spread illuminating apparatus of the fifth aspect of the present invention, the positional relation between the transparent substrate, the bar-like light source and the cover is ensured by the claw raised from the end of the cover, to thereby make the assembling of the spread illuminating apparatus easier, and make it possible to secure a desired brightness of the spread illuminating apparatus.

Further, according to the spread illuminating apparatus of the sixth aspect of the present invention, the side light type spread illuminating apparatus having a light source that consists of the bar-like light conductive member and the spot-like light source is capable of obtaining the above effects.

Further, according to the spread illuminating apparatus of the seventh aspect of the present invention, the positioning means is prevented from blocking the light entering the light conductive member from the spot-like light source, to thereby make the assembling of the spread illuminating apparatus easier and make it possible to secure a desired brightness of the spread illuminating apparatus.

What is claimed is:

1. A spread illuminating apparatus of a side light type, comprising:

a transparent substrate having a side surface, the transparent substrate being made of a transparent material;

a bar-like light source disposed close to the side surface of the transparent substrate;

a cover that covers an end of the transparent substrate and the bar-like light source; and positioning means for positioning the transparent substrate relative to the bar-like light source provided at a position where an end of the cover in a longitudinal direction overlaps a side surface of the transparent substrate, the positioning means being formed integrally with the cover.

2. The spread illuminating apparatus according to claim 1, wherein the positioning means is of a claw raised from the end of the cover.

3. The spread illuminating apparatus according to claim 1 wherein the bar-like light source is formed with a light conductive member and a spot-like light source disposed on at least one end of the light conductive member.

4. The spread illuminating apparatus according to claim 3, wherein the positioning means is provided at a position clear of the end of the light conductive member.

5. The spread illuminating apparatus according to claim 2, wherein the bar-like light source is formed with a light conductive member and a spot-like light source disposed on at least one end of the light conductive member.

* * * * *